(12) United States Patent
Osborn et al.

(10) Patent No.: US 7,231,204 B1
(45) Date of Patent: *Jun. 12, 2007

(54) METHOD AND APPARATUS FOR SELECTIVE AND AUTOMATIC TWO-WAY BEAMING OF RELATED INFORMATION TO AND FROM PERSONAL INFORMATION MANAGEMENT SYSTEMS

(75) Inventors: Neal A. Osborn, Milpitas, CA (US); David Creemer, Palo Alto, CA (US); Rod Alligood, San Jose, CA (US)

(73) Assignee: Palmsource, Inc., Sunnyvale, CA (US)

( * ) Notice: Subject to any disclaimer, the term of this patent is extended or adjusted under 35 U.S.C. 154(b) by 457 days.

This patent is subject to a terminal disclaimer.

(21) Appl. No.: 09/773,061

(22) Filed: Jan. 30, 2001

(51) Int. Cl.
*H04B 7/00* (2006.01)
*H04M 1/725* (2006.01)

(52) U.S. Cl. .................. 455/412.1; 455/462; 455/463; 455/464; 455/465; 455/466; 455/412.2; 455/556.2; 455/550.1; 455/41.2; 455/61; 345/753

(58) Field of Classification Search ........ 455/462–466, 455/412, 556.2, 550.1, 412.1, 412.2, 41.2, 455/61; 345/753
See application file for complete search history.

(56) References Cited

U.S. PATENT DOCUMENTS

| | | | |
|---|---|---|---|
| 4,977,520 A * | 12/1990 | McGaughey et al. ....... 345/753 |
| 5,929,848 A * | 7/1999 | Albukerk et al. ........... 715/700 |
| 6,600,902 B1 * | 7/2003 | Bell ........................... 455/41.2 |
| 6,633,759 B1 * | 10/2003 | Kobayashi .................. 455/419 |
| 6,826,387 B1 * | 11/2004 | Kammer .................... 455/41.2 |

* cited by examiner

*Primary Examiner*—Matthew Anderson
*Assistant Examiner*—Yuwen Pan
(74) *Attorney, Agent, or Firm*—Berry & Associates P.C.

(57) ABSTRACT

A method and system of automating two-way beaming of information from one handheld electronic device to another handheld electronic device. Specifically, the present invention discloses a method and system for selectively transmitting business cards, calendar appointments or executable programs from one device to a requesting device. The receiver makes the selection of a response. The receiver accepts the information, accepts and automatically transmits information of the same category, or rejects the information based on a user choice. If the user select the receive and transmit option, the device will automatically receives and file the information and sends information of the same category to the initiator of the transmission. The two-way transmission of information appears as one integral transmission between the users. In one embodiment, the data to be exchanged is business cards and the devices are handheld computer system.

20 Claims, 8 Drawing Sheets

METHOD AND APPARATUS FOR SELECTIVE AND AUTOMATIC TWO-WAY BEAMING OF RELATED INFORMATION TO AND FROM PERSONAL INFORMATION MANAGEMENT SYSTEMS

BACKGROUND OF THE INVENTION

1. Field of the Invention

The present invention relates to the field of computer systems and database technology. More specifically embodiments of the present invention relate to the field of portable electronic devices, such as personal digital assistants (PDAs), cell phones, pagers, etc.

2. Related Art

Recent miniaturization of electronic components has led the way to the reduction in size of almost all electronic components. Reduction in the size of electronic components resulted in physically smaller sized electronic devices. Manufacturers of the electronic components, at the same time, took the opportunity to add new features to the same or even to the reduced sized electronic devices.

Electronic organizers were introduced to the market more than two decades ago. These devices were commonly used to store and maintain address books, telephone listings and daily activity schedules albeit with limited number of records due to limited storage capacity. Subsequent development of such devices introduced limited capability calculating functions, weekly and monthly scheduling "to do lists" and business card files. The most noticeable developments in this family of devices, in the recent years, are increased memory size, reduced physical size, communication capabilities and increased functionality.

The emergence of Personal Digital Assistant, commonly known as PDA, introduced a new type of organizers. The PDA's have capability to store telephone numbers, addresses, daily appointments and software that keeps track of business or personal data such as expenses. Furthermore, the present PDA's have the capability to synchronize to a personal computer, thus enabling the two devices to exchange updated information together. Additionally, the PDA can connect to a modem, enabling it to have electronic mail (e-mail) capabilities. Another recent development in PDA technology is capability to browse Web pages located on the Internet and synchronize, e.g., HotSync, with another device or with a compatible personal computer. Moreover, an advanced PDA can have Internet capabilities to communicate over a wireless interface. (e.g. radio interface).

A typical PDA user often uses the device during a business meeting. The user can easily access his/her customized telephone directory, schedule business activities, send and receive e-mails, and connect to the Internet, etc.

More advanced PDA devices, such as hand-held computer systems, each have the capability to wirelessly exchange certain category of information such as an electronic business card. For example, in a business meeting, one needs not hand over a conventional paper business card to another participant in the meeting. If both parties own handheld computers, exchange of business cards can be accomplished electronically and wirelessly. In such situations, one requests a business card from another and the other party positions his/her handheld computer device facing that of the requester's and by push of a button simply beams an electronic version of his/her business card to the requester.

Presently, the distance between the two devices limits a successful transmission of information. The distance between a transmitting device and receiving device cannot be more than a few feet or maximum of three yards. Limitation of distance for a successful exchange of electronic business cards is one shortcoming in the available devices.

Generally the exchange of electronic business card is completed once the sender of a business card beams his/her card to the other person's handheld device which is ready to receive the information. However, If the sender of the electronically beamed electronic business card desires to receive the other party's electronic business card, then the entire process must be reinitiated. Available devices require two different user initiated transmissions and therefore two different sets of user initiated transactions for a bilateral exchange of business cards. Requirement of two sets of user initiated transactions to exchange business cards between two associates in and of itself is another shortcoming to the present systems.

User convenience is a very important factor for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities.

Therefore, by requiring two user initiated steps to perform an electronic business card swap, it is possible that many users will not perform a full exchange because the first receiver of the business card does not wish to manually go through with the trouble of initiating the last transfer of information. This may be because the first recipient is on the run, late for another meeting, or simply does not want to go through the manual processing of sending his/her business card to the first sender.

SUMMARY OF THE INVENTION

The present invention enables an owner of a handheld electronic device to receive a business card from another device and send his/her electronic business card to other party's device in one transaction. An embodiment of the present invention enables the users of these devices to exchange business cards automatically and with user initiation from only one party. For example, in a business meeting, an owner of one handheld device beams his/her business card to the owner of another's device and the receiver device selectively and electronically responds. The receiving device receives the signal from the requester and if the receiving device is in "RECEIVE AND AUTOMATIC RESPONSE" mode, it will receive the electronic business card, file the information and automatically send a responding business card to the requester who initiated the process. However, if the recipient device is set to "ACCEPT NO RESPONSE" mode, the receiving device will receive and file the business card but does not send a corresponding business card in return. Furthermore, a device may be set in "REJECT" mode; in which case the receiving devices neither accepts nor transmits an electronic business cards.

The present invention discloses a method and a system for selective exchange of electronic business cards, calendar information and general data structure between handheld computer systems. Furthermore, the present invention discloses a wireless exchange of the above-mentioned information by means of infrared communication or a communication mechanism, which is substantially compatible with a Bluetooth communication protocol.

A method and system are described of automating two way transmission of information from one handheld electronic device to another handheld electronic device. Specifically, the present invention discloses a method and system for selectively transmitting information, e.g., business cards, calendar appointments and general data structure, from one device to a requesting device. The receiver makes the selection of a response. The receiver accepts the information, accepts or transmits information of the same category, or rejects the information based on a user choice. If the user selects the RECEIVE AND AUTOMATIC RESPONSE option, the device automatically sends information requested to the receiver both to the sender so that the two way transmission appears as one integral transmission between the users. In one embodiment, the data to be exchanged is business cards and the devices are portable handheld computer system.

In one embodiment, a method for communicating certain category of information is disclosed. The disclosure describes an electronic device transmitting a category of information to an another device. The receiving device receives the information and displays the type of response it will communicate to the first device. The receiving device responds to the sending device information of the same category.

Furthermore, an embodiment of the invention discloses a handheld device implemented two-way beaming of electronic business cards, calendar information and executable programs. The embodiment uses a dialog box in each of sending and receiving devices. The dialogue box enables the users to set the response in their respective devices. Based on this setting the system will selectively and automatically responds to a requester. A device receiving a request for transmission of a business card, will decide, based on the set mode, to accept the information without a response, reject the information received, or accept and store the information and transmit information of the same type automatically.

DETAILED DESCRIPTION OF THE INVENTION

Reference will now be made in detail to the preferred embodiments of the present invention, automatic beaming of business card or same category information between handheld computer systems, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or "transmitting" or "beaming" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device having a wireless or other communication mechanism and organized records of information, such as a cell phone or a pager. One of the common types of electronic systems, which can be used in accordance with one embodiment of the present invention, is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a personal computer, enabling the two devices to exchange updated information that is synchronizing the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface).

In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

Figure 1:
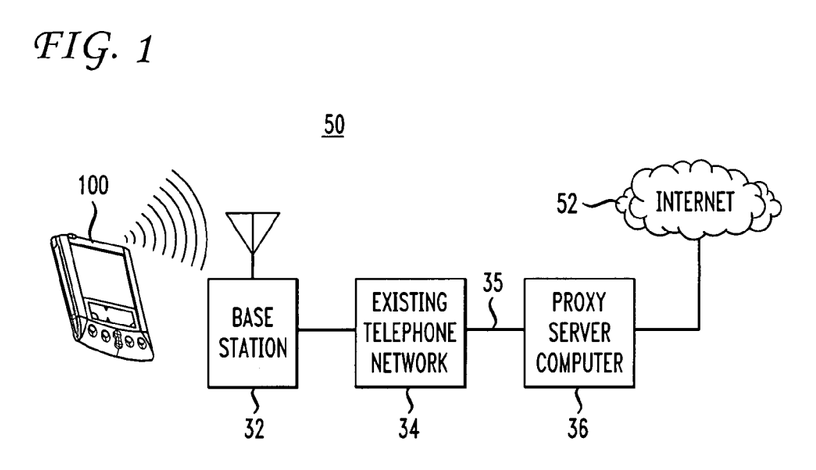
FIG. 1 is a block diagram of an exemplary network environment including an exemplary personal digital assistant.

FIG. 1 is a block diagram of an exemplary network environment 50 including an exemplary personal digital assistant. The PDA 100 is also known as a palmtop or palm-sized electronic system or computer system. The PDA 100 has the ability to transmit and receive data and information over a wireless communication interface (e.g., a radio interface). The PDA 100 is one exemplary implementation on which the present invention can operate. The present invention can operate on any portable electronic system or device.

In one embodiment, base station 32 is both a transmitter and receiver base station, which can be implemented by coupling it into an existing public telephone network 34. Implemented in this manner, base station 32 enables the personal digital assistant 100 to communicate with a proxy server computer system 36, which is coupled by wire 35 to the existing public telephone network 34. Furthermore, proxy server computer system 36 is coupled to the Internet 52, thereby enabling the PDA 100 to communicate with the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the PDA 100 and base station 32. It should be appreciated that one embodiment of a wireless communication system in accordance with the present invention is the Mobitex wireless communication system.

Figure 2A:
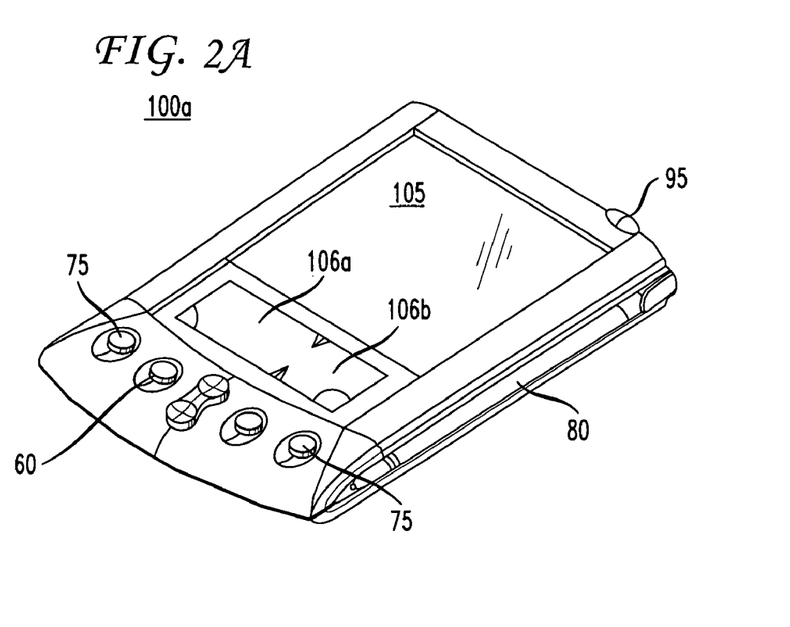
FIG. 2A is a perspective illustration of the top face of one embodiment of the palmtop computer system

FIG. 2A is a perspective illustration of the top face 100a of one embodiment of the palmtop computer system. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a or 106b. The stroke information is then fed to an internal processor for automatic character recognition. Once characters are recognized, they are typically displayed on the screen for verification and/or modification.

Figure 2B:
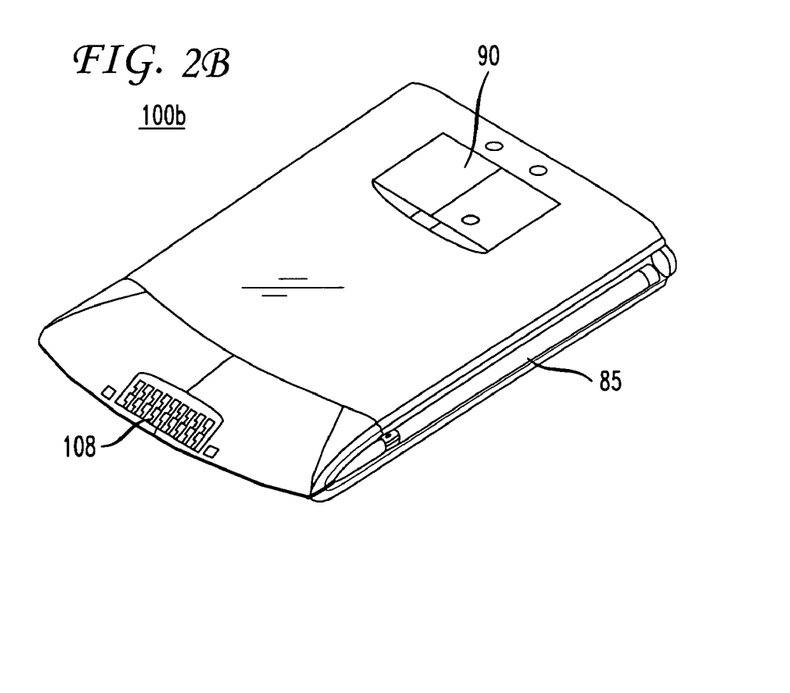
FIG. 2B illustrates the bottom side of one embodiment of the palmtop computer system.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, USB, SCSI, Firewire (IEEE 1394), Ethernet, etc. It is appreciated that interface 108 can also be used for charging current when using rechargeable batteries.

Figure 3:
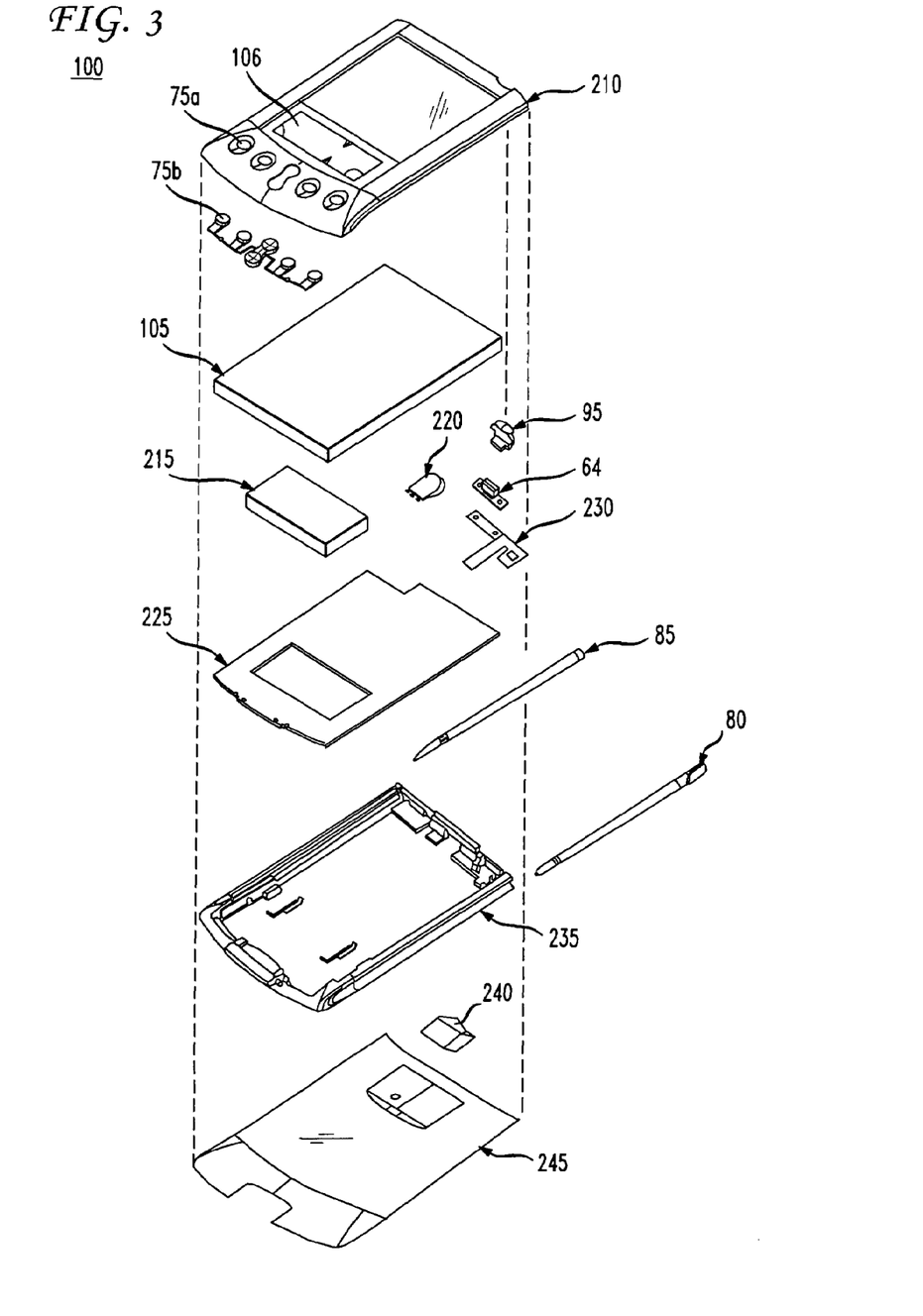
FIG. 3 is an exploded view of the components of an exemplary palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. A digitizer pad can be part of the display assembly or it can also be included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communications between system 100 and other networked computers and/or the Internet via a proxy server. In other embodiments, TCP protocol can be used.

Figure 4:
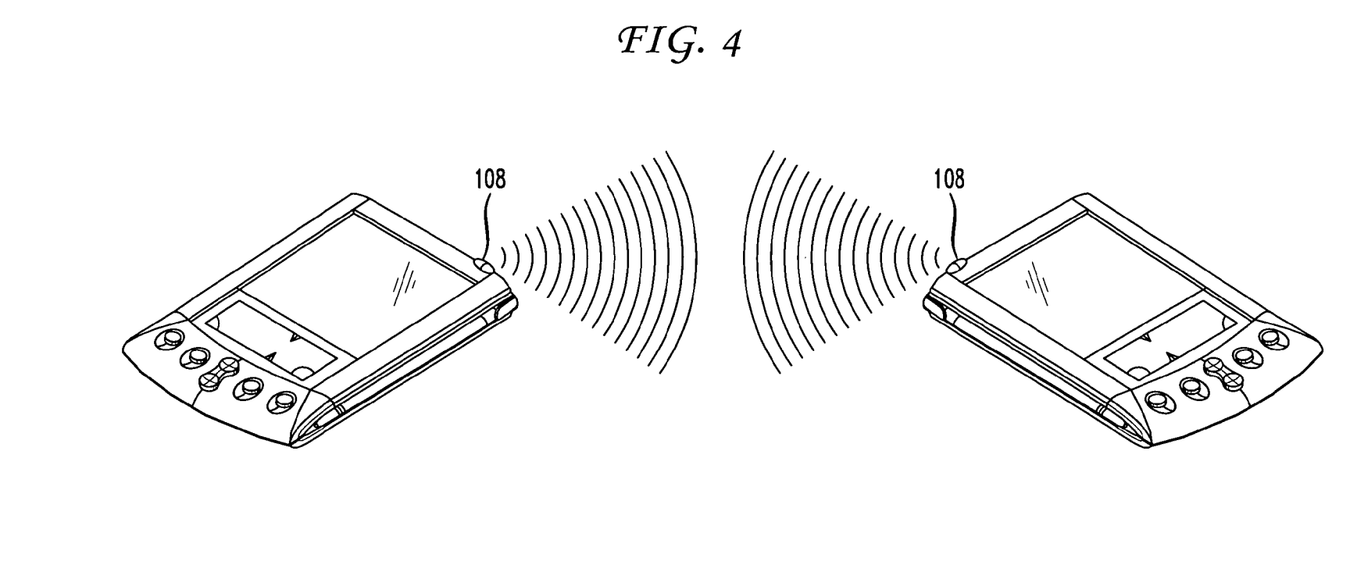
FIG. 4 illustrate two portable electronic devices beaming information automatically in a two-way beam.

FIG. 4 illustrates two-way beaming between two devices. The number of devices transmitting information is not limited to two devices. A requesting device sends and receives information through a wireless communication interface 108, which ca be bluetooth or IR in one example.

FIG. 4 illustrates the two-way automatic beaming session. FIG. 4 configuration depicts a first device (i.e. the top device) sending information of certain category to a second device, (i.e.) bottom device, which receives the information and automatically transmits information of the same category to the first device. For example the owner of the top device initiates the transmission by sending his/her business card and the bottom device receives the business card, files it and automatically sends the business card of its owner in return.

Figure 5:
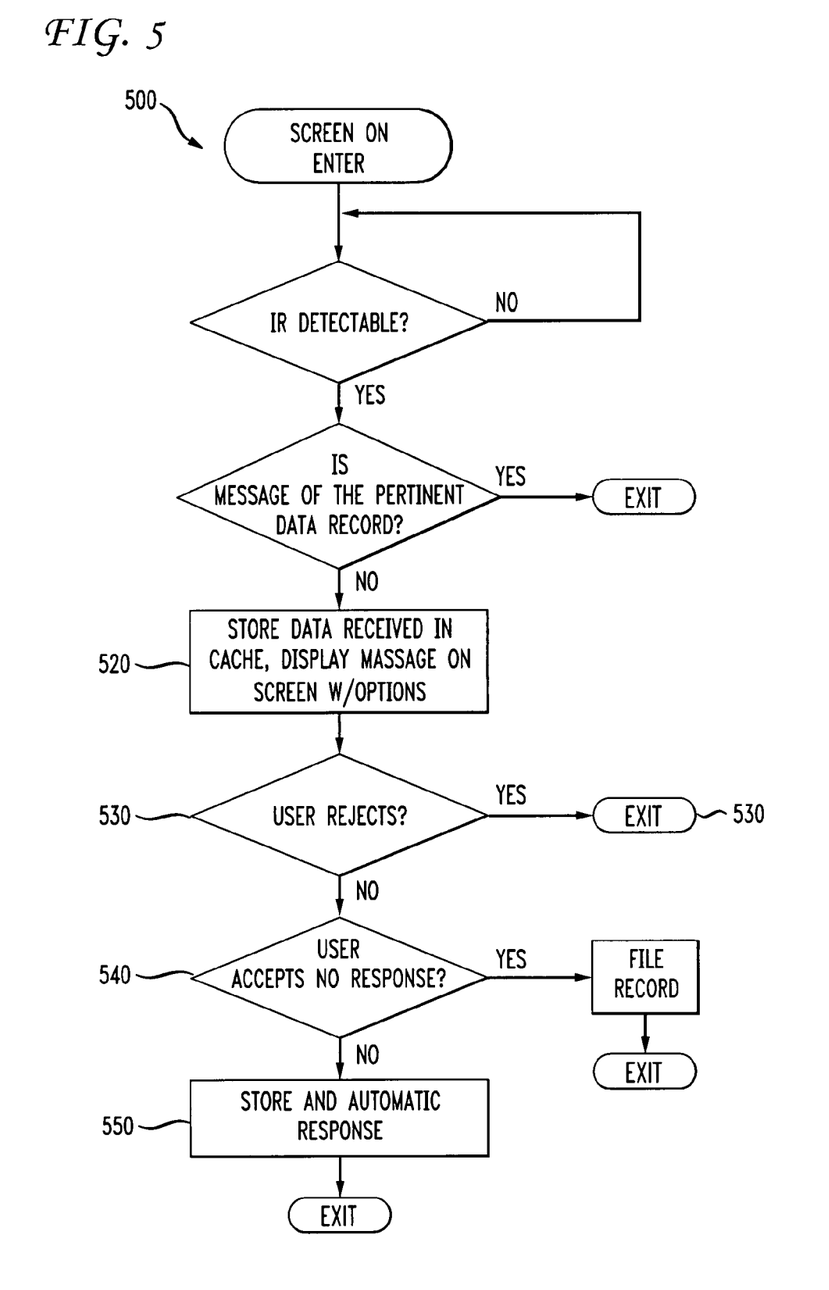
FIG. 5 is a flow block diagram of an exemplary process in accordance with an embodiment of the present invention.

FIG. 5 illustrates the flow diagram implementing a dialog session to set the mode for selective two-way beaming of the information. To set the mode the screen is turned on. Once the screen is turned on for the initial implementation, the IR device, which is attached to the serial port 108 of the receiving device, continuously looks for an IR signal. At the step 520, once a IR signal is detected, a piece of software called the serial manager gets the entire transmitted communication form the transmitting device and the receiving device parses the received information. At step 520, the system stores the data received in cache memory and displays a message on the screen indicating receipt of data.

Figure 6:
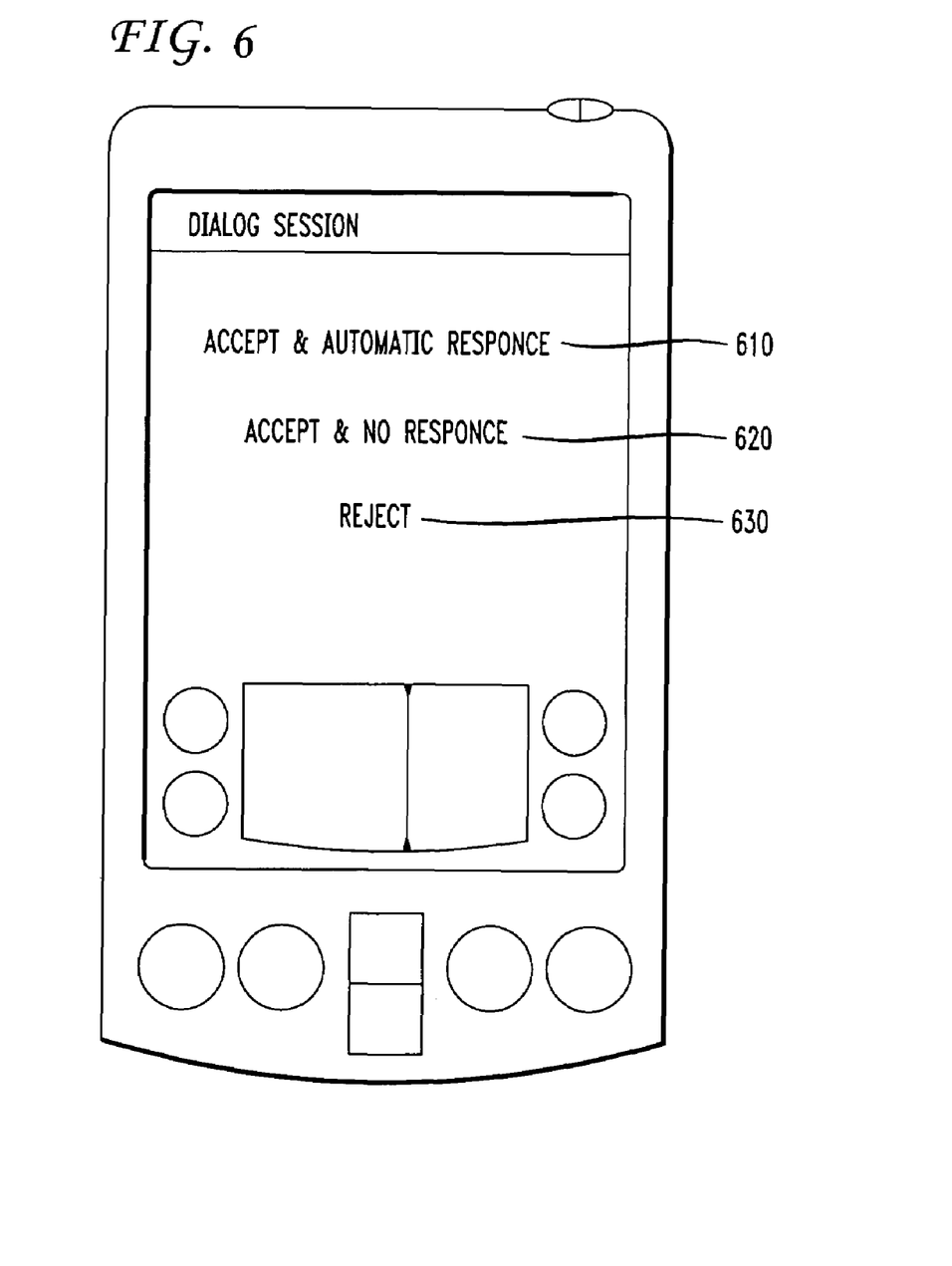
FIG. 6 illustrates the display screen during a dialogue session; the mode of transmission is set during this session.

During this user interface, the user is presented with the screen depicted in FIG. 6. At this stage the user of the receiver device can select one of the following three modes of option. The user can select step 530 in which case the receiver device will not accept any incoming data and will transmit no response. If the user selects step 540, the receiver device will accept the incoming information but it does not transmit a corresponding response. However, if the user wants to receive the incoming request and automatically respond to the sender with the information of the same category, step 550 is chosen. Step 550 is the object of this invention, whereby the receiver system receives the information of a particular category and automatically sends back the information of the same type to the one who initiated the process. In one example, the receiver device accepts an electronic business card from a sending device and upon the user selecting choice 550.

FIG. 6 illustrates the display screen 105 view of a receiver device during a dialogue session. Upon receipt of the first transmission, the screen displays three different mode settings and the owner of the device can select and set the device for one of the following modes: ACCEPT & AUTOMATIC RESPONSE 610, ACCEPT NO RESPONSE 620 or REJECT 630. The receiving and responding devices each can have a dialogue box and each can be set to the desired mode for two way automatic beaming before the selective and automatic exchange can be accomplished.

Figure 7:
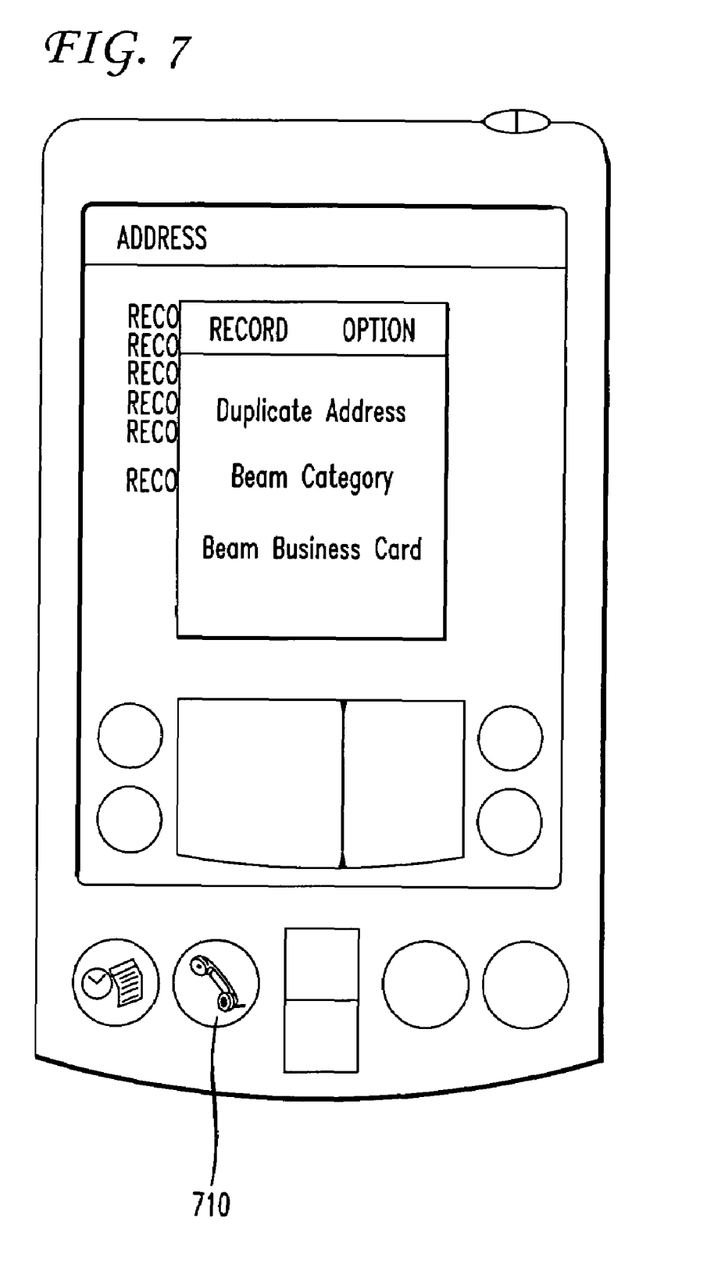
FIG. 7 illustrates screen when address button 88 of FIG. 2A is depressed; tapping on "Beam Business card" choice causes the transmission of the information.

FIG. 7 illustrates screen 105 when application icon 88 is tapped. The system is ready to beam the user's electronic business card. In one mode of operation, the two way-beaming processes require both devices, the receiving and transmitting devices to have BEAM BOX 240 of FIG. 3. Tapping on "BEAM BUSINESS CARD" choice causes the transmission of the information.

Alternatively, the user can simply hold down phone icon 710 for 1–2 seconds to initiate two-way beaming.

Figure 8:
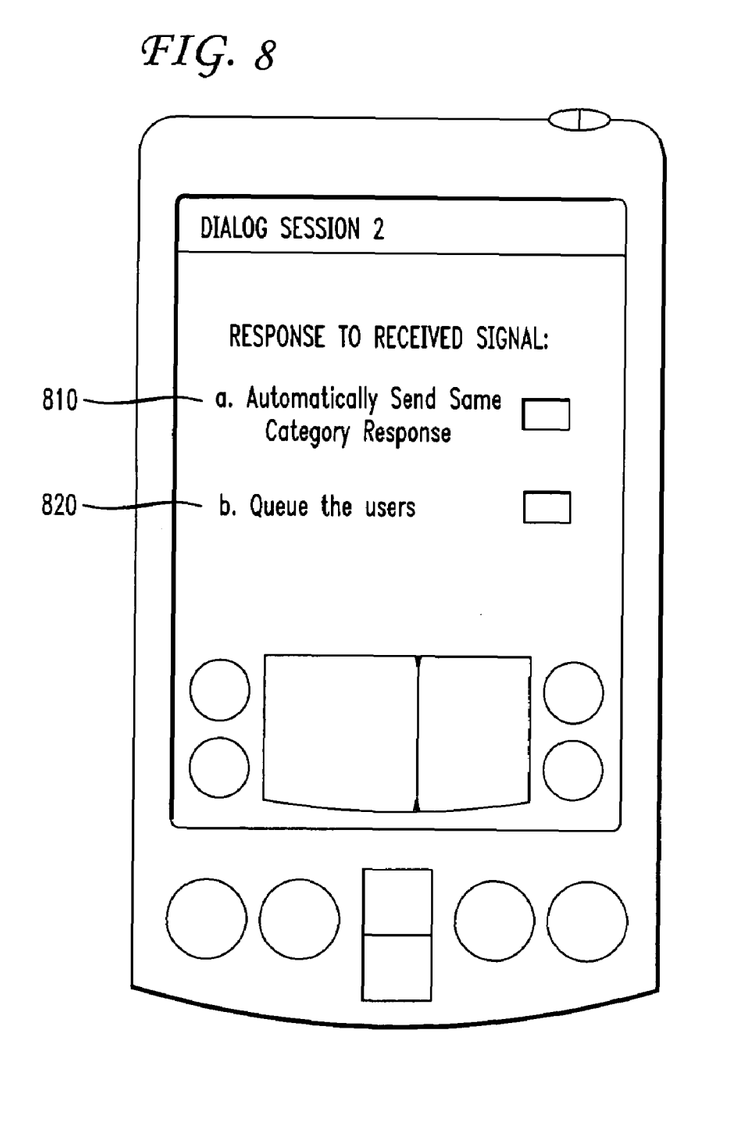
FIG. 8 illustrates screen during the "response mode setting.

FIG. 8 illustrates an operating system screen 105 where the owner of the device is given the choice of a response upon reviewing of the electronically received information. The user can use the screen of FIG. 8 to program preferences for the two-way beam process.

The owner of the device can select "AUTOMATICALLY SEND SAME CATEGORY RESPONSE" 810, in which case the device does not wait for the owner's decision for response and sends information of the same category back to sender automatically. In this case, the user is not presented the choices of FIG. 6 but rather selection 610 is automatically assumed as default.

If the owner of the device selects the "CUE THE USERS" mode 820, the device will receive the information and keeps it in cache memory. Screen 6 will then be and the owner can choose one of the choices in FIG. 6 menu.

What is claimed is:

1. A method of communicating information comprising the steps of:
   a) communicating a first information from a first electronic device to a second electronic device using a wireless communication mechanism, said first information having an information category type;
   b) said second electronic device receiving said first information;
   c) in response to step b), said second electronic device automatically displaying a message indicating at least one user selection, said user selection selected from the group consisting of accept and automatic response, accept and no response, and reject; and
   d) responsive to a particular user selection, said second electronic device automatically communicating second information to said first electronic device wherein said second information is of said information category type.

2. A method as described in claim 1 wherein said wireless communication mechanism is infrared communication.

3. A method as described in claim 1 wherein said wireless communication mechanism is substantially compatible with a Bluetooth communication protocol.

4. A method as described in claim 1 wherein said first and said second electronic devices are both palm-sized computer systems.

5. A method as described in claim 1 wherein said information category type is an electronic business card.

6. A method as described in claim 1 wherein said information category type is calendar information.

7. A method as described in claim 1 wherein said information is data base files.

8. A method of communicating information comprising the steps of:
   a) communicating a first electronic business card from a first electronic device to a second electronic device using a wireless communication mechanism;
   b) said second electronic device receiving said first electronic business card;
   c) in response to step b), said second electronic device automatically displaying a message indicating at least one user selection, said user selection selected from the group consisting of accept and automatic response, accept and no response, and reject; and
   d) responsive to a particular user selection, said second electronic device storing said first electronic business card and automatically communicating a second electronic business card to said first electronic device.

9. A method as described in claim 8 wherein said communication mechanism is infrared communication.

10. A method as described in claim 8 wherein said communication mechanism is substantially compatible with a Bluetooth communication protocol.

11. A method as described in claim 8 wherein said first and said second electronic devices are both palm-sized computer systems.

12. A method as described in claim 8 wherein said first electronic business card represents an owner of said first electronic device and wherein said second electronic business card represents an owner of said second electronic device.

13. A method as described in claim 8 wherein step c) comprises the step of said second electronic device allowing a user to select between: 1) accepting said first electronic business card; 2) rejecting said first electronic business card; and 3) accepting said first electronic business card and automatically transmitting said second electronic business card.

14. A first portable electronic device comprising:
   a processor coupled to a bus;
   a wireless transceiver coupled to said bus;

a display screen coupled to said bus; and a memory coupled to said bus and comprising instructions that implement a method of communicating information comprising the steps of:
a) receiving a first electronic business card from a second portable electronic device, said first electronic business card transmitted using a wireless communication mechanism and received by said wireless transceiver;
b) in response to step a), said first portable electronic device automatically displaying a message indicating at least one user selection, said user selection selected from the group consisting of accept and automatic response, accept and no response, and reject; and
c) responsive to a particular user selection, said first portable electronic device storing said first electronic business card.

15. A first portable electronic device as described in claim 14 wherein said wireless communication mechanism is infrared communication.

16. A first portable electronic device as described in claim 14 wherein said wireless communication mechanism is substantially compatible with a Bluetooth communication protocol.

17. A first portable electronic device as described in claim 14 wherein said first portable electronic device is a palm-sized computer system.

18. A first portable electronic device as described in claim 14 wherein said first electronic business card represents an owner of said second portable electronic device and wherein said second electronic business card represents an owner of said first portable electronic device.

19. A first portable electronic device as described in claim 14 wherein step b) of said method comprises the step of said first portable electronic device allowing a user to select between: 1) accepting said first electronic business card; 2) rejecting said first electronic business card; and 3) accepting said first electronic business card and automatically transmitting said second electronic business card.

20. A first portable electronic device as described in claim 14 wherein said display screen is a liquid crystal display screen.

* * * * *